(12) United States Patent
Delbos

(10) Patent No.: US 9,211,944 B2
(45) Date of Patent: Dec. 15, 2015

(54) ACTUATOR FOR GAS-OPERATED EMERGENCY OPENING OF AN OPENABLE ELEMENT OF AN AIRCRAFT, HAVING MEANS FOR VENTING THE GAS

(75) Inventor: Eric Delbos, Lacapelle-Marival (FR)

(73) Assignee: RATIER FIGEAC, Figeac Cedex (FR)

( * ) Notice: Subject to any disclaimer, the term of this patent is extended or adjusted under 35 U.S.C. 154(b) by 1236 days.

(21) Appl. No.: 13/048,662

(22) Filed: Mar. 15, 2011

(65) Prior Publication Data

US 2011/0225963 A1 Sep. 22, 2011

(30) Foreign Application Priority Data

Mar. 16, 2010 (FR) ...................................... 10 51863

(51) Int. Cl.
B64C 1/14 (2006.01)

(52) U.S. Cl.
CPC ........... *B64C 1/1407* (2013.01); *F15B 2211/21* (2013.01)

(58) Field of Classification Search
CPC ........... F15B 2211/21; F15B 2211/218; F15B 2211/212; F15B 1/022; B60R 21/272; B60R 21/33; B60R 21/274; F17C 2205/032; F17C 2205/0323
USPC .................. 91/5; 60/470; 222/3, 5; 137/68.3, 137/118.07; 441/93, 94; 244/905; 169/75
See application file for complete search history.

(56) References Cited

U.S. PATENT DOCUMENTS

| | | | | |
|---|---|---|---|---|
| 1,776,865 A * | 9/1930 | Salisbury | ...................... | 244/107 |
| 1,818,597 A * | 8/1931 | Adams et al. | ................. | 244/107 |
| 2,000,708 A * | 5/1935 | Mapes | ............................ | 169/11 |
| 2,039,014 A * | 4/1936 | Mapes | ............................... | 222/5 |
| 2,052,186 A * | 8/1936 | Mapes | .......................... | 244/107 |
| 2,073,670 A * | 3/1937 | Allen | ................................. | 222/5 |
| 2,073,688 A * | 3/1937 | Freygang | ........................... | 222/5 |
| 2,130,333 A * | 9/1938 | Allen | ............................... | 222/5 |
| 2,206,818 A * | 7/1940 | Mapes | ......................... | 137/68.3 |
| 2,522,849 A * | 9/1950 | Taylor | ....................... | 244/129.1 |
| 3,145,573 A * | 8/1964 | Hebenstreit | ......................... | 74/2 |
| 3,169,665 A * | 2/1965 | Colley | ............................... | 222/5 |
| 3,938,704 A * | 2/1976 | Milgram | ........................... | 222/5 |
| 4,805,802 A * | 2/1989 | MacKendrick et al. | .......... | 222/5 |
| 6,685,139 B2 * | 2/2004 | Blum et al. | ................ | 244/129.5 |
| 7,143,775 B2 * | 12/2006 | Sundholm et al. | ........... | 137/68.3 |
| 2004/0113017 A1 | 6/2004 | Baderspach et al. | | |
| 2007/0045473 A1 | 3/2007 | Clegg et al. | | |

FOREIGN PATENT DOCUMENTS

FR 2 833 657 A1 6/2003

* cited by examiner

*Primary Examiner* — Edward Look
*Assistant Examiner* — Michael Quandt
(74) *Attorney, Agent, or Firm* — Birch, Stewart, Kolasch & Birch, LLP

(57) ABSTRACT

Actuator for gas-operated emergency opening of an openable element of an aircraft, having the ability to vent the gas. The actuator for emergency opening of an openable element of an aircraft includes a thrustor, a pressurised-gas reservoir where the gas reservoir having a membrane capable of being perforated in order to actuate said thrustor, a movable perforator arranged to perforate said membrane of said reservoir in order to release the gas into the thrustor via a first fluid circuit, and a venting circuit that vents, away from the thrustor, the gas contained in the reservoir, in the event of accidental rupture of said membrane, via a second fluid circuit which does not actuate said thrustor.

19 Claims, 5 Drawing Sheets

ACTUATOR FOR GAS-OPERATED EMERGENCY OPENING OF AN OPENABLE ELEMENT OF AN AIRCRAFT, HAVING MEANS FOR VENTING THE GAS

The present invention relates to an actuator for emergency opening of an openable element of an aircraft, having:

a thrustor arranged to be connected, at one of its ends, to said openable element and, at its other end, to a reference element of the aircraft to which said openable element is linked, a pressurised-gas reservoir, said gas reservoir having a membrane capable of being perforated in order to actuate said thrustor for the purpose of emergency opening of the openable element by release of the gas from the reservoir, a movable perforator arranged to perforate said membrane of said reservoir in order to release the gas contained in the latter into the thrustor via a first fluid circuit.

Such actuators are known, which have the disadvantage, especially in the case of accidental rupture of the perforatable membrane, of releasing the gas from the reservoir directly into the actuator. The effect of this is to subject the locking elements to pressure, when the openable element is locked or, when it is not, to accidentally open the openable element.

The object of the present invention is essentially to overcome that disadvantage, and to provide other advantages.

More specifically, the present invention relates to an actuator for emergency opening of an openable element of an aircraft, as defined hereinabove, which is characterised in that it additionally comprises means for venting, away from the thrustor, the gas contained in the reservoir, via a second fluid circuit which does not actuate said thrustor, in the event of accidental rupture of said membrane occurring in the absence of displacement of the movable perforator.

The creation of a venting circuit makes it possible to divert the gas from the reservoir away from the thrustor in the event of accidental opening of the reservoir at the gas-releasing membrane.

According to an advantageous characteristic, said first and second fluid circuits have a common fluid circuit part.

This characteristic offers simplification of the thrustor-operating and venting circuits.

According to an advantageous characteristic, the actuator according to the invention includes a valve which is actuated by the gas released from the reservoir and which is movable between the following two positions:

a first position, referred to as the position of rest, in which said means for venting the gas contained in the reservoir away from the thrustor, in the event of accidental rupture of said membrane, are active, said second fluid circuit being open (flow-permitting), a second position, referred to as the active position, in which said means for venting the gas contained in the reservoir away from the thrustor, in the event of accidental rupture of said membrane, are inactive, said second fluid circuit being closed (obstructed) and said first fluid circuit being open (flow-permitting).

According to an advantageous characteristic, said fluid circuit part common to said first and second fluid circuits is arranged, at least in part, in said movable perforator.

According to an advantageous characteristic, said movable valve has an annular shape arranged around the movable perforator; and in that the movable perforator has a radial fluid passageway in communication with an axial internal fluid conduit in the movable perforator, said radial fluid passageway being disposed:

on a first side of the valve in said first position of the latter, the movable perforator being in a position of rest with the membrane not percussed, so as to open said venting means by opening the second fluid circuit, and on a second side of the valve, opposite said first side, in said second position of the valve, the movable perforator being in an active position with the membrane percussed, so as to close said venting means as a result of said movable valve closing said second fluid circuit.

According to an advantageous characteristic, said common fluid circuit part comprises said radial fluid passageway and said axial internal fluid conduit in the movable perforator.

According to an advantageous characteristic, said movable valve takes up said first position under the effect of a resilient biasing means and takes up said second position under the effect of the gas released from the reservoir.

According to an advantageous characteristic, the actuator according to the invention includes a third fluid circuit, for venting of said thrustor during closure of the openable element, comprising a part of said first fluid circuit and a part of said second fluid circuit, both of which parts are different from said fluid circuit part that is common to those two, first and second, fluid circuits.

According to an advantageous characteristic, said third fluid circuit, for venting of said thrustor during closure of the openable element, is active (open) when said movable valve is in its first position.

According to an advantageous characteristic, the actuator according to the invention includes a fourth fluid circuit, for manual safety discharge of the gas contained in said gas reservoir, passing through said membrane.

According to an advantageous characteristic, said fourth fluid circuit, for manual safety discharge of the gas contained in said gas reservoir, is independent of said first and second fluid circuits and has a control means having a captive screw.

According to an advantageous characteristic, said gas reservoir includes:

an envelope body, a filling stopper associated with said envelope body, said membrane, with a view to its subsequent perforation for triggering of said actuator, being welded to said filling stopper and said pressurised-gas reservoir being closed by a weld between said filling stopper and said envelope body.

Other characteristics and advantages will appear on reading hereinbelow of an example of an embodiment of an actuator according to the invention accompanied by drawings, which example is given by way of non-limiting illustration.

Figure 1:
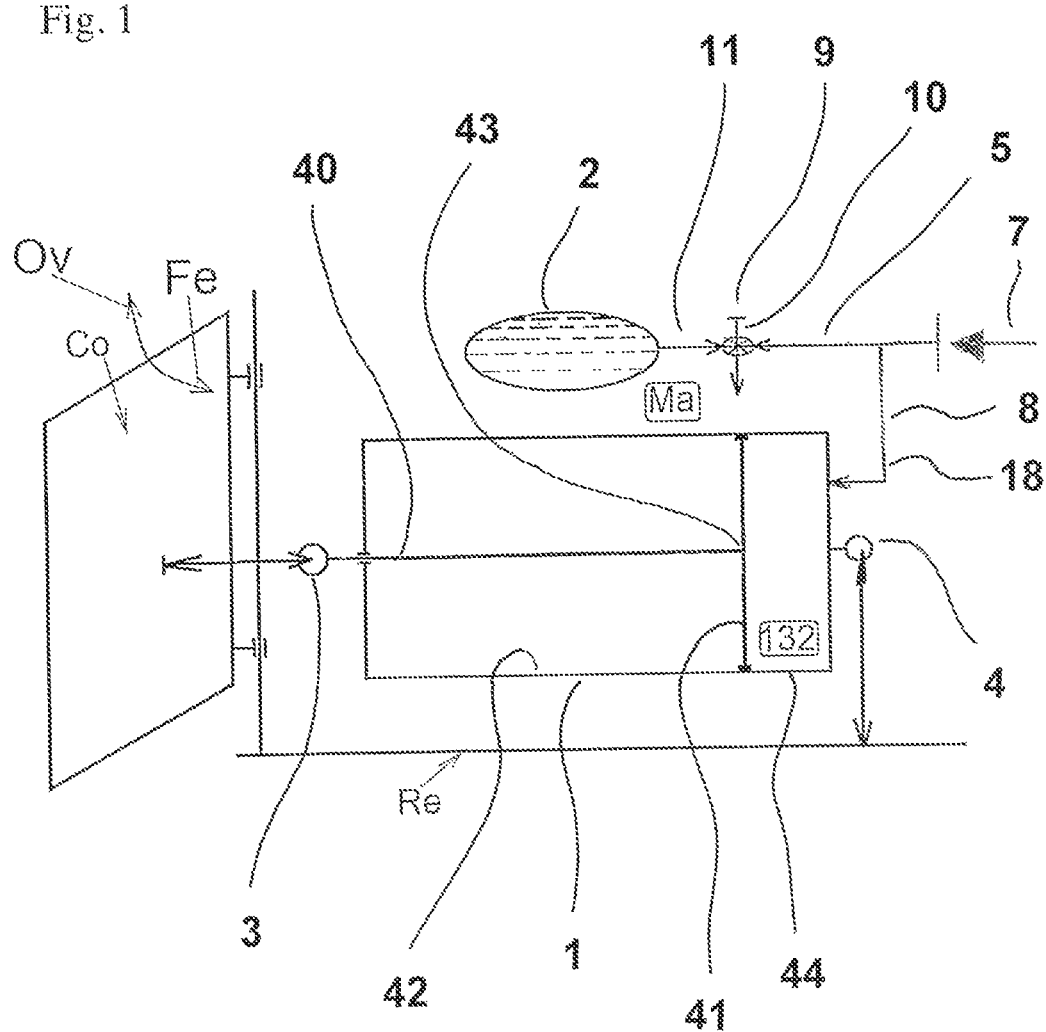
FIG. 1 shows, in diagrammatic form, an example of an embodiment of an actuator for emergency opening of an openable element of an aircraft, in accordance with the invention.

The actuator for emergency opening of an openable element Co of an aircraft, shown in diagrammatic form in FIG. 1, comprises:

a thrustor 1 arranged to be connected, at one 3 of its ends, to the openable element Co and, at its other end 4, to a reference element Re of the aircraft to which the openable element is linked, for example the aircraft frame or any other linking element inteimediate between the openable element Co and said frame, it being possible for the linking element to be in movement during opening Ov and closing Fe of the openable element, a pressurised-gas reservoir 2, the gas reservoir 2 having a membrane 6 (FIGS. 2 to 5) capable of being perforated in order to actuate the thrustor 1 for the purpose of emergency opening of the openable element Co as a result of release of the gas from the reservoir 2, a movable perforator 7 arranged to perforate the membrane 6 of the reservoir 2 in order to release the gas contained in the latter into the thrustor 1 via a first fluid circuit 8, means 9 for venting, away from the thrustor 1, the gas contained in the reservoir 2, via a second fluid circuit 10 which does not actuate the thrustor 1, in the event of accidental rupture of the membrane 6 occurring in the absence of displacement of the movable perforator 7.

The thrustor 1 is, in itself, of known type and will not be described in detail herein. In the example shown in diagrammatic form, that end 3 of the thrustor 1 which is linked to the openable element Co is a first 3 end of a stem 40 of the thrustor 1, at the second 43 end of which stem there is fixed a piston 41 which undergoes displacement within a cylinder 42 formed in the body 44 of the thrustor. The internal walls of the cylinder 42 and that wall of the piston 41 which is opposite that from which the stem 40 extends define a variable-volume chamber 132 into which the gas from the reservoir 2 is injected under pressure when it is released from the reservoir 2 in order to actuate the openable element Co in the event of emergency opening of the latter, as will be explained hereinbelow.

The reservoir 2 can consist of any gas reservoir of known type, generally associated with the body 44 of the thrustor 1 by a fully fixed connection, as shown in FIGS. 2 to 5, which can be dismantled in order to allow replacement of said reservoir 2 after use of the latter or in the course of a maintenance operation. The gas reservoir 2 will preferably be a gas reservoir 2 including:

an envelope body 22, a filling stopper 23 associated with the envelope body 22, the perforatable membrane 6 for triggering of the actuator being welded to the filling stopper 23, the pressurised-gas reservoir 2 being closed by a weld 36 between the filling stopper 23 and the envelope body 22.

In the example shown, the filling stopper 23 of the reservoir 2 preferably bears the perforation membrane 6, which is welded to it, the stopper 23 being screwed inside a neck 46 formed by the envelope body 22. The reservoir 2 obtained is entirely welded and is advantageously associated with the body 44 of the thrustor, by screwing in the example. An entirely welded reservoir means that the gas reservoir 2 contains no passageway that is not impeded by a weld, for gas contained therein, from the inside of the reservoir to the environment outside the reservoir.

In the example, the reservoir 2 is connected to the body 44 of the thrustor 1 in known manner by a thread 47 formed on the outside of the neck 46 of the bottle 1, in which the filling stopper 23 is held, by screwing and welding. It should be noted that, in alternative manner, the reservoir 2 could have a neck in which the welded filling stopper 23 is held and which is not used for fixing the reservoir 2 to the body 44 of the thrustor 1.

In the example shown, there is advantageously provided a gasket 45, for example and preferably in the shape of a torus, which gasket is referred to as temporary, and which is held in a circular groove formed in an outer cylindrical surface of the filling stopper 23, as shown in FIGS. 2 to 5. This gasket 45, referred to as temporary, is arranged to co-operate with a cylindrical sealing surface preferably, and as shown in the example, formed on the inside of the neck 46 of the reservoir 2 and thereby forming sealing referred to as temporary.

Temporary sealing is understood herein as being sealing which has a non-negligible predetermined level of leakage which makes it possible to place the weld 36 of definitive closure of the reservoir 2 under pressure using the gas contained in the latter. The sealing referred to as temporary allows the filling of gas into the reservoir 2 and sealing of the latter just for the time for producing the weld 36 of definitive closure. Several methods or means can be used for arriving at that end. Preference will be given to a solution consisting of allowing a non-negligible level of leakage once the stopper 23 has been completely put in place after filling and before welding, or consisting of allowing a non-negligible level of leakage after completion of the welding and by virtue thereof, for example by destroying the gasket 35 referred to as temporary by the heating caused by the welding 36.

Once filled and welded, the pressurised-gas reservoir 2 is advantageously fixed to the body 44 of the thrustor 1, preferably by screwing as indicated hereinbefore.

The envelope body 22 of the reservoir 2 according to the example shown is advantageously of one-piece construction, for example entirely welded, and the welding of the filling stopper 23 to the envelope body 22 makes it possible to provide an entirely welded reservoir.

In a means of implementation, a method of filling and sealed closure of the pressurised-gas reservoir 2 described hereinbefore comprises the steps consisting of:

screwing a gas-filling and closing apparatus of known type onto a male thread of the reservoir 2, for example the thread 47 for fixing the reservoir 2 to the body 44 of the thrustor 1 forming the opening actuator, which in this example is formed on the neck 46 of the reservoir 2, introducing the pressurised gas into the reservoir 2 by means of the gas-filling and closing apparatus, screwing the filling stopper 23, in this example into the neck 46 of the reservoir 2, with the aid of the apparatus, by means of the thread 47, in order to force the stopper 23 onto the neck 46 and to activate the temporary sealing gasket 35.

The movable perforator 7 arranged to perforate the membrane 6 of the reservoir 2 in order to release the gas contained in the latter into the thrustor 1 via a first fluid circuit 8 is advantageously composed of a stem 49 which is movable in translation along an axis 50 substantially or exactly perpendicular to the perforatable membrane 6 of the reservoir or, that is to say, in the example shown, in the axis of a hole formed in the body 44 of the thrustor 1 holding the neck 46 of the reservoir 2 and bearing the thread 47 for screwing in of the neck 46 as shown in FIGS. 2 to 5.

Figure 2:
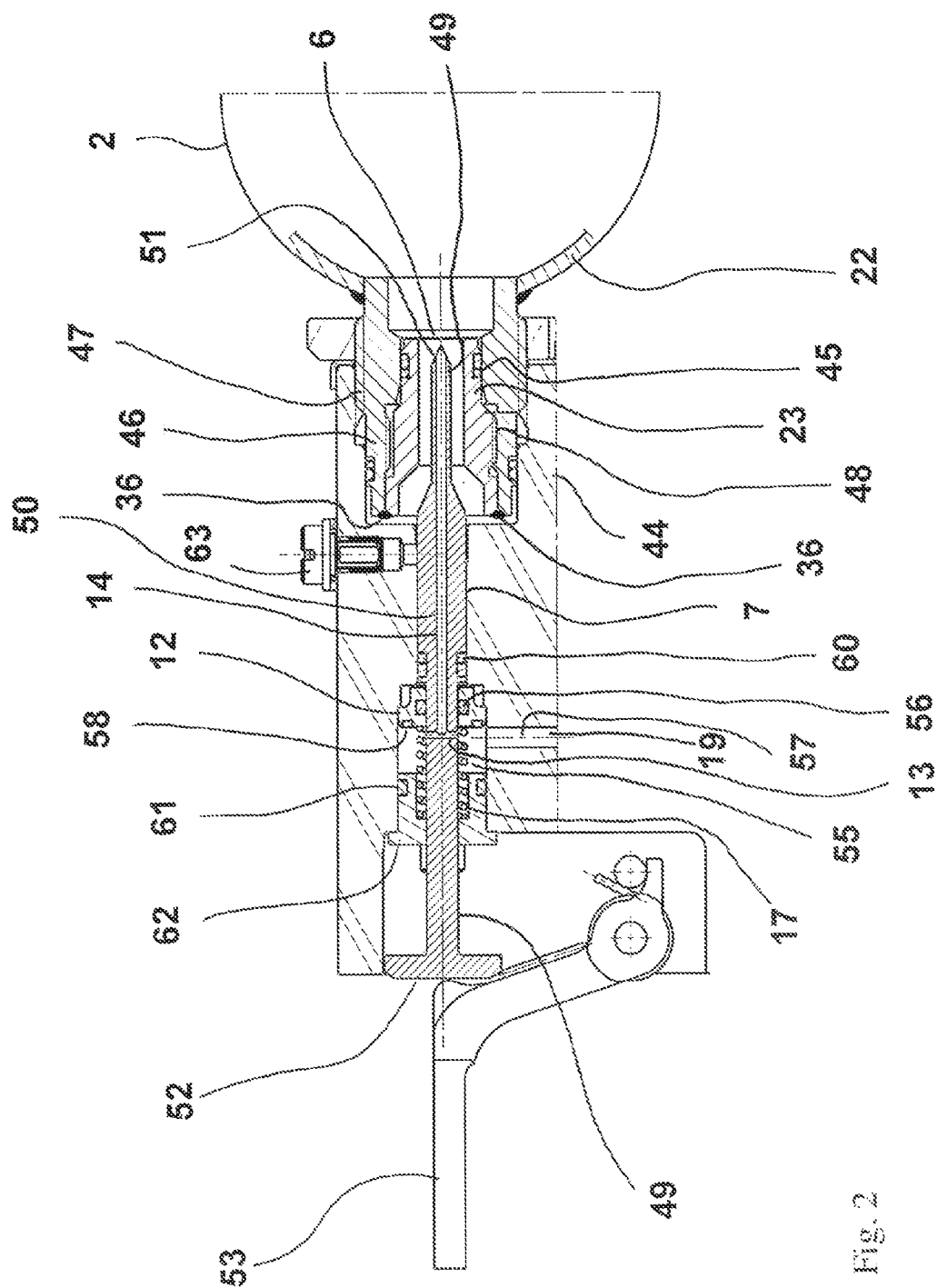
FIG. 2 shows, in partial longitudinal section, an example of an embodiment of an actuator according to the invention corresponding to the example in diagrammatic form in FIG. 1, in an inactive position of the movable perforator, the membrane of the gas reservoir being unbroken and the pressurised gas being contained in the reservoir.

The stem 49 has a first end 51 capable of perforating the membrane 6, for example being shaped into a point for that purpose, and a second end 52 opposite the first, on which there acts a percussion lever 53 in order to displace the stem 49 towards the membrane 6 and to perforate the latter. The percussion lever 53 is of known type and will not be described in greater detail herein. FIG. 2 shows the stem 49 in the position of rest, away from the membrane 6, the latter being intact and not percussed. This position of rest of the percussion stem 49 is made advantageously stable, for example by means of a ball (not shown) or similar, which can retract when subject to pressure, held in a recess (not shown) formed on the stem 49, exerting a pressure against the stem 49 so as to require a minimal effort for displacement of the latter in translation towards the membrane 6.

The stem 49 is guided in translation advantageously in a bore which is coaxial with the axis of the hole holding the neck 46 of the reservoir 2. The percussion stem 49 does not have, in the example, resilient biasing into the position of rest, so as to provide an outward visual indication of percussion showing the need to replace or refill the reservoir after use. Once the membrane 6 has been percussed by the stem 49, the gas is released into the first fluid circuit 8 through an axial internal fluid conduit 14 in the movable perforator, composed of a longitudinal, advantageously axial, hole formed in the percussion stem 49, as shown in FIGS. 2 to 5, and opening out at the first end 51 of the stem 49.

Figure 3:
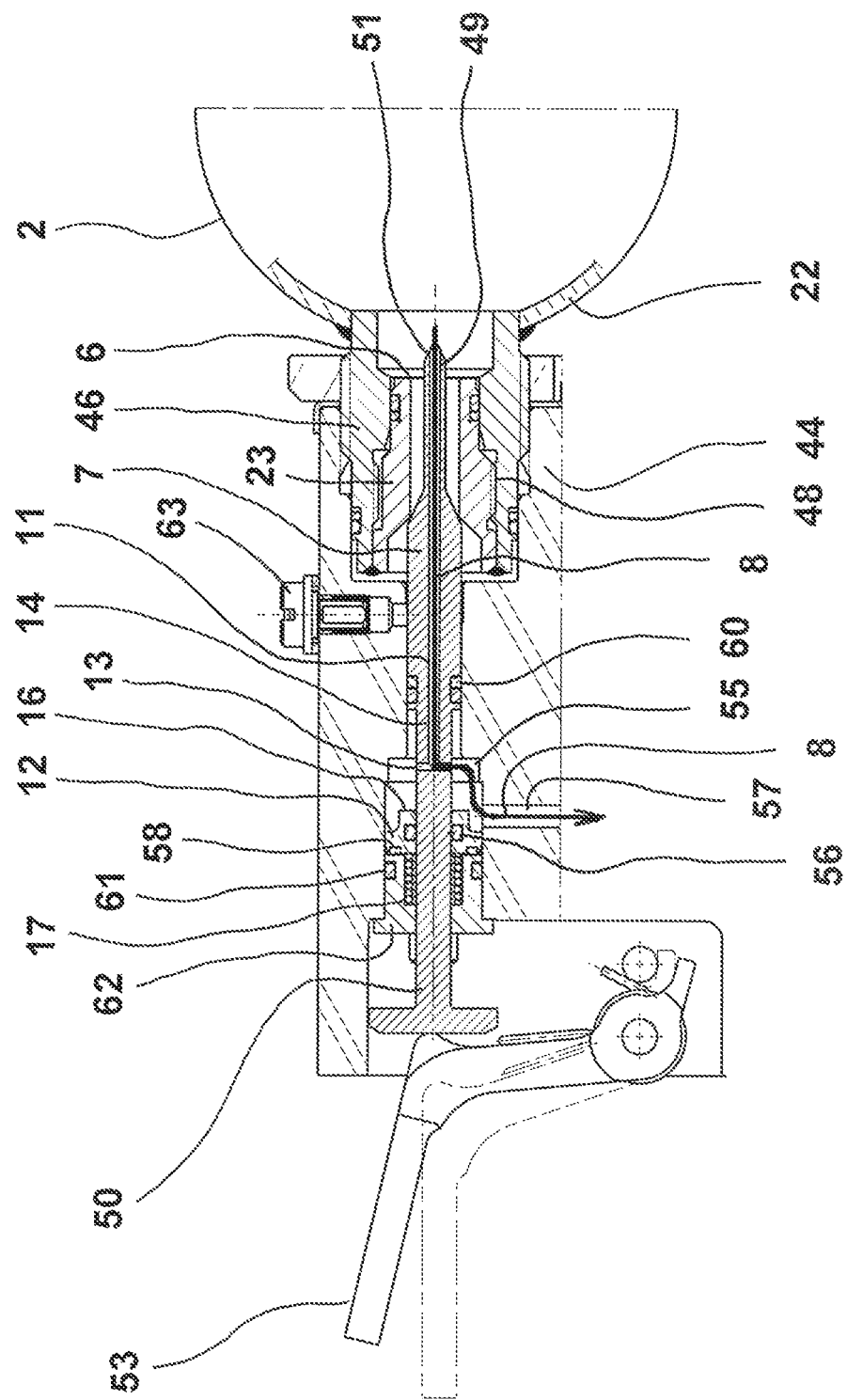
FIG. 3 shows, in partial longitudinal section, the example of FIG. 2 in an active position of the movable perforator, the membrane having been perforated and the pressurised gas directed into the thrustor, the first fluid circuit, for feeding the thrustor, being active (flow-permitting) and being shown in the Figure.
Figure 4:
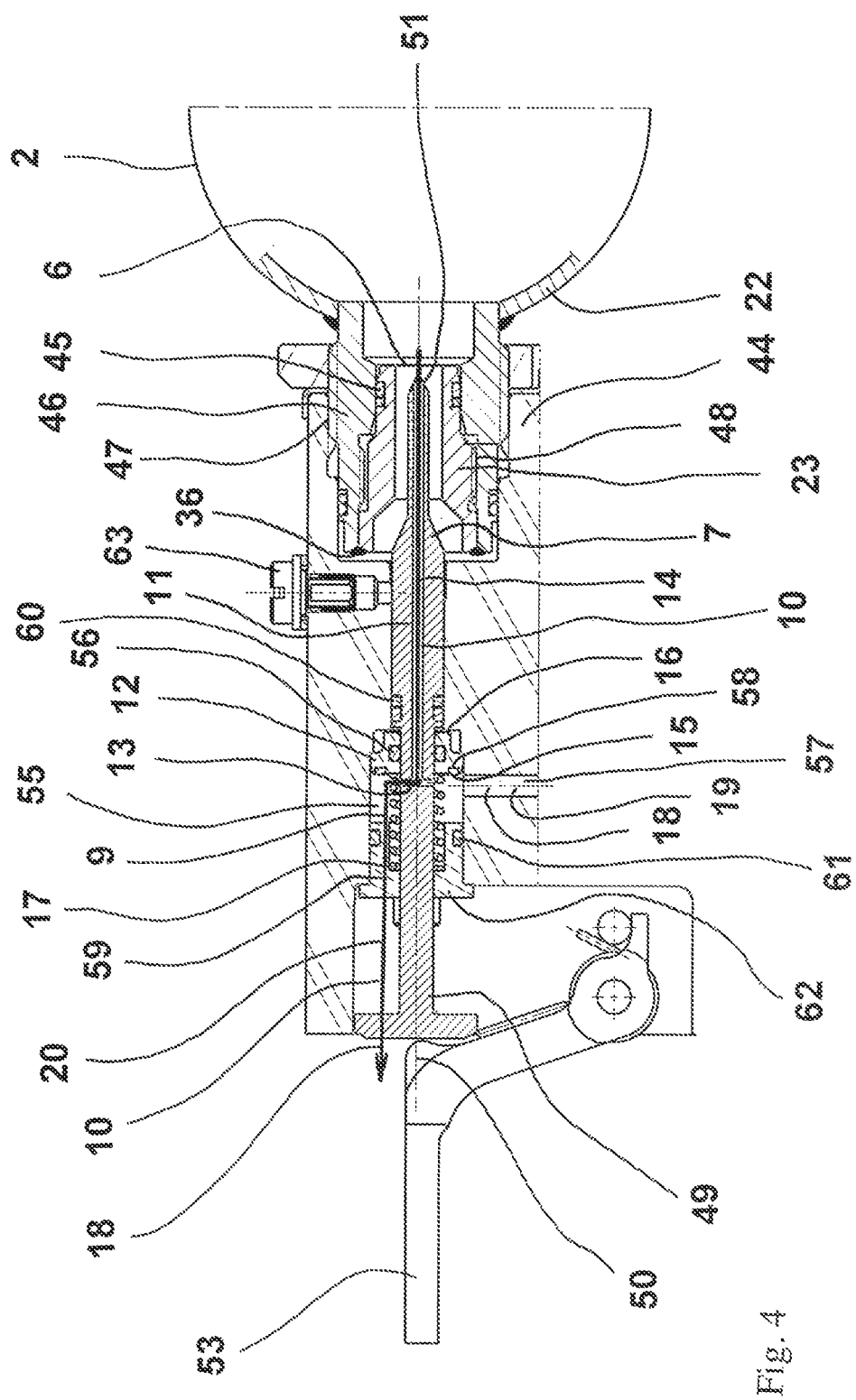
FIG. 4 shows a partial longitudinal section similar to that of FIG. 2, the second, venting, fluid circuit being active (flow-permitting) and being shown in the Figure.

The first 8 and second 10 fluid circuits advantageously have a common fluid circuit part 11, as shown in FIGS. 3 and 4, that common fluid circuit part 11 preferably being arranged, at least in part, in the movable perforator 7 and, in the example shown, being more especially at least formed by the axial internal fluid conduit 14 in the stem 49.

The actuator shown in FIGS. 2 to 5 advantageously has a valve 12 which is actuated by the gas released from the reservoir 2 and which is movable between the following two positions:

a first position, referred to as the position of rest, in which the means 9 for venting the gas contained in the reservoir away from the thrustor 1, in the event of accidental rupture of the perforatable membrane 6, are active, the second fluid circuit 10 being open, or flow-permitting, that position of rest being shown in FIGS. 4 and 2, a second position, referred to as the active position, in which the means 9 for venting the gas contained in the reservoir away from the thrustor 1, in the event of accidental rupture of the perforatable membrane 6, are inactive, the second fluid circuit 10 being closed, or obstructed, and the first fluid circuit 8 being open, or flow-permitting, that active position being shown in FIG. 3.

The movable valve 12 preferably has an annular shape arranged around the movable perforator 7 or, that is to say, in the example, around the stem 49. The movable perforator has a radial fluid passageway 13 formed in the stem 49 at the internal end of the axial internal fluid conduit 14 in the stem 49, in communication with that conduit, as shown in FIGS. 2 to 5, the radial fluid passageway 13 being arranged in the stem 49 with the axial internal fluid conduit 14 so as to be disposed:

on a first 15 side of the valve 12 in the first position of the latter, the percussion stem 49 being in its position of rest—membrane 6 not percussed—shown in FIGS. 4 and 2, so as to open the venting means 9 by opening the second fluid circuit 10, and on a second 16 side of the valve 12, opposite the first 15 side, in the second position of the valve 12, the percussion stem 49 being in its active position—membrane 6 percussed—shown in FIG. 3, so as to close the venting means 9 as a result of the movable valve 12 closing, in that second position, the second fluid circuit 10 and opening the first fluid circuit 8.

The valve 12 undergoes displacement in translation in a chamber 55 which is formed in the body 44 of the thrustor 1 and which is coaxial with the axis 50 of displacement of the stem 49 between the two longitudinal ends of the chamber 55, which form end-stops for displacement of the valve 12. A sealing gasket 56 is placed between the annular valve 12 and the stem 49 in order to ensure sealing with respect to the pressurised fluid contained in the reservoir 2 between those two parts, the stem 49 and the valve 12.

An orifice 57 in fluid communication with the chamber 132 in the thrustor 1 opens out into the chamber 55 in which the valve 12 moves; this orifice 57 is so positioned in the chamber 55 and the latter is so dimensioned in terms of length that:

the orifice 57 is located on the first 15 side of the valve 12 in the first position of the latter, shown in FIGS. 4 and 2, so as to allow venting of the gas contained in the chamber 132 in the piston 41 on manual closure of the openable element Co (third fluid circuit 18 described in detail hereinbelow), and the orifice 57 is located on the second 16 side of the valve 12, opposite the first 15 side, in the second position of the valve 12, shown in FIG. 3, so as to open the first fluid circuit 8 for feeding pressurised gas into the chamber 132 for emergency opening of the openable element Co.

It is to be noted that, on displacement of the percussion stem 49 from its position of rest (FIGS. 2 and 4) into its active, percussed membrane 6, position (FIG. 3), the radial passageway 13 moves from the first 15 side of the valve 12 to the second 16 side of said valve 12 in order to allow displacement of the valve 12 from its position of rest (FIGS. 2 and 4) into its active position (FIG. 3), once the membrane 6 has been percussed, under the effect of the pressurised gas released from the reservoir 2 exerting, in that active position of the stem 49, a force on the second 16 side of the valve 12 in order to close the second, venting, fluid circuit 10.

The valve 12 accordingly forms a rapid-control valve actuated by the pressurised gas under the effect of the displacement of the percussion stem 49 into the active, percussed membrane 6, position in order to establish a fluid connection between the pressurised-gas reservoir 2 and the chamber 132 of the piston 41 of the thrustor 1.

A sealing gasket 58 is placed on the first 15 side of the valve 12, as shown in FIGS. 2 to 5, so as to ensure sealing between that side 15 of the valve 12 and the longitudinal end of the chamber 55 against which the valve 12 comes into abutment in its second position, shown in FIG. 3. This sealing gasket 58 has the function of ensuring sealing of the first fluid circuit 8 with respect to the pressurised gas, between that end of the chamber 55 against which the valve 12 comes into abutment in its second position and the protruding part of the percussion stem 49 passing through that end of the chamber 55, as shown in FIGS. 2 to 5.

Accordingly, as shown in FIG. 3, the first fluid circuit 8 is successively composed of the following elements, starting from the membrane 6 of the reservoir 2:

the axial internal fluid conduit 14 in the stem 49, opening out at that end 51 of the stem 49 which is capable of perforating the membrane 6 of the reservoir 2, the radial fluid passageway 13 formed in the stem 49 at the internal end of the axial fluid conduit 14, part of the bore for guiding the stem 49, into which part the radial passageway 13 opens out when the percussion stem 49 is in the active, percussed membrane, position, that part of the bore opening out into the chamber 55, the chamber 55 formed in the body 44 of the thrustor 1, when the valve 12 is in its second position, the fluid conduit (not shown in entirety in FIGS. 2 to 5) connecting the chamber 55 to the chamber 132 of the piston 41, via the orifice 57 opening out into the chamber 55 and shown in FIGS. 2 to 5.

Furthermore, as shown in FIG. 4, the second, venting, fluid circuit 10 is successively composed of the following elements:
- the axial internal fluid conduit 14 in the stem 49, opening out at that end 51 of the stem 49 which is capable of perforating the membrane 6 of the reservoir 2,
- the radial fluid passageway 13 formed in the stem 49 at the internal end of the axial fluid conduit 14,
- the chamber 55 formed in the body 44 of the thrustor 1, when the valve 12 is in its first position,
- the fluid conduit 59 passing through the base of the chamber 55 (against which the valve 12 is in abutment in its second position) located beside the percussion lever 53 and in fluid communication with the external environment when the valve 12 is in its first position; this fluid conduit 59 can be, for example, composed of axial holes (not shown) passing through the base of the chamber 55, arranged to the inside of a circumference equal to the internal diameter of the sealing gasket 58 and/or composed of longitudinal tangential passageways arranged between the stem 49 and its crossing through the base of the chamber 55.

It will be noted that, in the example shown, the orifice 57 for producing a fluid connection between the chamber 55 of the valve 12 and the chamber 132 of the piston 41 establishes such a connection in the two extreme, first and second, positions of the valve 12; this configuration of the orifice 57 with respect to the valve is advantageous for the presence of a third fluid circuit 18, which will be described in detail hereinbelow; accordingly, as a result of such a configuration, the pressurised-gas vent in the base of the chamber 55, forming part of the second fluid circuit 10, will be dimensioned so that the cross-section of the gas passageway is sufficient so that the loss of head caused is such that displacement of the piston 41 is not brought about. When the valve 12 is in its second position, it obstructs the fluid conduit 59, closing the second fluid circuit 10.

It is to be noted that a sealing gasket 60 can be advantageously placed between the percussion stem 49 and that part of the body 44 of the thrustor 1 which serves for guiding that stem 49 in translation, as shown in FIGS. 2 to 5. The function of this sealing gasket 60 is to ensure channelling of the fluid towards a fourth fluid circuit 21, as described in detail hereinbelow, whilst avoiding pressurising the chamber 132 of the thrustor.

The base of the chamber 55, against which the valve 12 comes into abutment in its second position (FIG. 3) can advantageously be composed of a removable stopper 62 fixed to the body 44 of the thrustor 1, as shown in FIGS. 2 to 5. This removable stopper 62 has a sealing gasket 61 in order to prevent an escape of pressurised gas towards the environment outside the chamber 55, or the ambient environment Ma, in the second position of the valve 12 (FIG. 3).

As shown in FIGS. 3 and 4, the fluid circuit part 11 that is common to the first 8 and second 10 fluid circuits comprises the radial fluid passageway 13 and the axial internal fluid conduit 14 in the movable perforator 7 or, that is to say, the stem 49, in the example shown. In addition, part of the chamber 55 is also common to the first 8 and second 10 fluid circuits, as shown in FIGS. 3 and 4.

The movable valve 12 advantageously takes up its first position, referred to as the position of rest, under the effect of a resilient biasing means 17 and takes up its second position, referred to as the active position, under the effect of the gas released from the reservoir 2. The resilient biasing means 17 can be composed of a biasing spring placed between the first side 15 of the valve 12 and the base of the chamber 55 formed by the stopper 62, as shown in FIGS. 2 to 5. The spring 17 is calculated so that the pressurised gas released from the reservoir 2 after percussion of the membrane 6 will displace the valve 12 from its first position into its second position in abutment against the base of the chamber 55 against the biasing force exerted by said spring 17. In any other configuration, the spring 17 is determined so that the valve 12 remains in its first position (FIG. 4) under the effect of the biasing force exerted by the spring.

The shown actuator advantageously includes a third fluid circuit 18, for venting the thrustor 1 during closure of the openable element Co, comprising a part 19 of the first fluid circuit 8 and a part 20 of the second fluid circuit 10, both of which parts are different from the fluid circuit part 11 that is common to those two, first 8 and second 10, fluid circuits and that is composed of the radial passageway 13 and the axial passageway 14 which are formed in the percussion stem 49. This third fluid circuit 18 is shown in part in FIGS. 2 and 4. That part 19 of the first fluid circuit 8 which forms part of the third circuit 18 is composed of the fluid conduit part included between the orifice 57 opening out into the chamber 55 and the chamber 132 of the piston 41. That part 20 of the second fluid circuit 10 which forms part of the third circuit 18 is composed of the fluid conduit 59 passing through the base of the chamber 55 (against which the valve 12 is in abutment in its second position), which is described hereinbefore, establishing a fluid connection between the chamber 55 and the ambient environment Ma in the position of rest of the valve 12. The chamber 55 as defined when the valve 12 is in its position of rest ensures communication between those fluid circuit parts 19 and 20 in order to form the third circuit 18, for venting the piston 41 of the thrustor 1. Accordingly, the third 18 fluid circuit, for venting the thrustor 1 during closure of the openable element Co, is active, or open, when the movable valve 12 is in its first position or position of rest. This third fluid circuit 18 forms a means of placing the chamber 132 of the piston 41 of the thrustor 1 in fluid communication with the ambient environment Ma when it is not fed with pressurised fluid coming from the reservoir 2.

Figure 5:
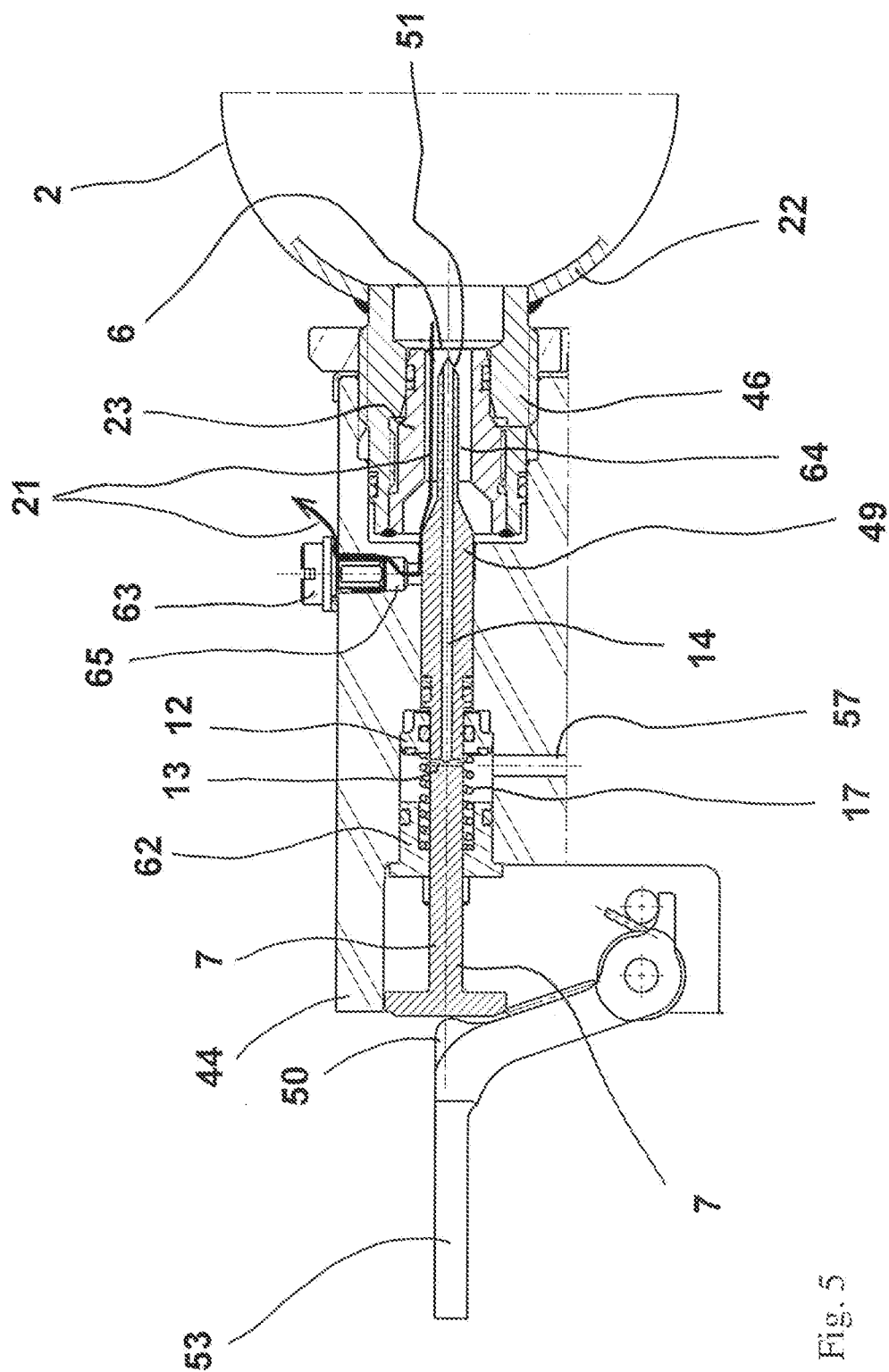
FIG. 5 shows, in a partial longitudinal section, the example according to FIG. 2, the fourth fluid circuit, for manual safety discharge of the gas contained in said gas reservoir, being active and being shown in the Figure.

As shown in FIG. 5, the actuator advantageously includes a fourth fluid circuit 21, for manual safety discharge of the gas contained in the gas reservoir 2, passing through the percussion membrane 6. This fourth fluid circuit 21, for manual safety discharge of the gas contained in the gas reservoir 2, is preferably independent of the first 8 and second 10 fluid circuits and has a control means having a captive screw 63. For this purpose, the fourth circuit 21 includes a passageway 64 formed, in the example, in large part in the stopper 23 of the reservoir 2 located around the end 51 of the percussion stem 49, in contact with the membrane 6 of the reservoir 2, which opens out into a threaded hole 65 in which the captive screw 63 is screwed, as shown in FIG. 5. The main function of this fourth circuit 21 is to allow the passageway 64 to be placed under atmospheric pressure for safety reasons before any removal of the reservoir 2, for example in the case of obstruction of the second, venting, fluid circuit 10. In the example shown, the perforatable membrane 6 is located at the internal end of the stopper 23 penetrating into the neck 46 of the reservoir 2.

The invention claimed is:
1. An actuator for emergency opening of an openable element of an aircraft, the actuator comprising:
a thrustor arranged to be connected, at one of its ends, to said openable element and, at its other end, to a reference element of the aircraft to which said openable element is linked, a pressurised-gas reservoir, said gas reservoir having a membrane capable of being perforated in order to actuate said thrustor for the purpose of emergency opening of the openable element by release of the gas from the reservoir, a movable perforator arranged to perforate said membrane of said reservoir in order to release the gas contained in the latter into the thrustor via a first fluid circuit, a venting circuit capable of venting, away from the thrustor, the gas contained in the reservoir, via a second fluid circuit which does not actuate said thrustor, in the event of accidental rupture of said membrane occurring in the absence of displacement of said movable perforator, wherein a movable valve which is actuated by the gas released from the reservoir and the movable valve capable of moving relative to the movable perforator between the following two positions:

a first position, referred to as the position of rest, in which said venting circuit for venting the gas contained in the reservoir away from the thrustor, in the event of accidental rupture of said membrane, is active, said second fluid circuit being open, and a second position, referred to as the active position, in which said venting circuit for venting the gas contained in the reservoir away from the thrustor, in the event of accidental rupture of said membrane, is inactive, said second fluid being closed and said first fluid circuit being open.

2. The actuator according to claim 1, wherein said first and second fluid circuits include a common fluid circuit part.

3. The actuator according to claim 2, wherein said common fluid circuit part is arranged, at least in part, in said movable perforator.

4. The actuator according to claim 3, wherein said movable valve has an annular shape arranged around the movable perforator and in that the movable perforator has a radial fluid passageway in communication with an axial internal fluid conduit in the movable perforator, said radial fluid passageway being disposed:

on a first side of the movable valve in said first position of the latter, the movable perforator being in a position of rest with the membrane not percussed, so as to open said venting circuit by opening the second fluid circuit, and on a second side of the movable valve, opposite said first side, in said second position of the movable valve, the movable perforator being in an active position with the membrane percussed, so as to close said venting circuit as a result of said movable valve closing said second fluid circuit.

5. The actuator according to claim 3, wherein said movable valve takes up said first position under the effect of a resilient biasing element and takes up said second position under the effect of the gas released from the reservoir.

6. The actuator according to claim 2, wherein the movable valve which is actuated by the gas released from the reservoir and which is movable between the following two positions:

a first position, referred to as the position of rest, in which said venting circuit for venting the gas contained in the reservoir away from the thrustor, in the event of accidental rupture of said membrane, is active, said second fluid circuit being open, a second position, referred to as the active position, in which said venting circuit for venting the gas contained in the reservoir away from the thrustor, in the event of accidental rupture of said membrane, is inactive, said second fluid circuit being closed and said first fluid circuit being open.

7. The actuator according to claim 2, further comprising:
a third fluid circuit, for venting of said thrustor during closure of the openable element, comprising a part of said first fluid circuit and a part of said second fluid circuit, both of which parts are different from said fluid circuit part that is common to those two, first and second, fluid circuits.

8. The actuator according to claim 1, wherein said movable valve has an annular shape arranged around the movable perforator and in that the movable perforator has a radial fluid passageway in communication with an axial internal fluid conduit in the movable perforator, said radial fluid passageway being disposed:

on a first side of the movable valve in said first position of the latter, the movable perforator being in a position of rest with the membrane not percussed, so as to open said venting circuit by opening the second fluid circuit, and on a second side of the movable valve, opposite said first side, in said second position of the movable valve, the movable perforator being in an active position with the membrane percussed, so as to close said venting circuit as a result of said movable valve closing said second fluid circuit.

9. The actuator according to claim 8, wherein a common fluid circuit part comprises said radial fluid passageway and said axial internal fluid conduit in the movable perforator.

10. The actuator according to claim 9, wherein said movable valve takes up said first position under the effect of a resilient biasing element and takes up said second position under the effect of the gas released from the reservoir.

11. The actuator according to claim 8, wherein said movable valve takes up said first position under the effect of a resilient biasing element and takes up said second position under the effect of the gas released from the reservoir.

12. The actuator according to claim 1, wherein said movable valve takes up said first position under the effect of a resilient biasing element and takes up said second position under the effect of the gas released from the reservoir.

13. The actuator according to claim 1, further comprising:
a third fluid circuit, for venting of said thrustor during closure of the openable element, comprising a part of said first fluid circuit and a part of said second fluid circuit, both of which parts are different from a common fluid circuit part that is common to those two, first and second, fluid circuits.

14. The actuator according to claim 13, wherein said third fluid circuit, for venting of said thrustor during closure of the openable element, is active in a case that said movable valve is in its first position.

15. The actuator according to claim 1, further comprising:
a fourth fluid circuit, for manual safety discharge of the gas contained in said gas reservoir, passing through said membrane.

16. The actuator according to claim 15, wherein said fourth fluid circuit, for manual safety discharge of the gas contained in said gas reservoir, is independent of said first and second fluid circuits and has a controller having a captive screw.

17. The actuator according to claim 1, wherein said gas reservoir includes:

an envelope body, a filling stopper associated with said envelope body, said membrane, with a view to its subsequent perforation for triggering of said actuator, being welded to said filling stopper and said pressurised-gas reservoir being closed by a weld between said filling stopper and said envelope body.

18. The actuator according to claim 1, wherein a common fluid circuit part is arranged, at least in part, in said movable perforator.

19. The actuator according to claim 1, further comprising:

a third fluid circuit, for venting of said thrustor during closure of the openable element, comprising a part of said first fluid circuit and a part of said second fluid circuit, both of which parts are different from a common fluid circuit part that is common to those two, first and second, fluid circuits.

* * * * *